United States Patent
Im (10) Patent No.: US 11,242,906 B2
(45) Date of Patent: Feb. 8, 2022

(54) VARIABLE DAMPING FORCE SHOCK ABSORBER

(71) Applicant: MANDO CORPORATION, Gyeonggi-do (KR)

(72) Inventor: Wonbeen Im, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 16/830,202

(22) Filed: Mar. 25, 2020

(65) Prior Publication Data

US 2020/0309228 A1    Oct. 1, 2020

(30) Foreign Application Priority Data

Mar. 26, 2019    (KR) .................. 10-2019-0034526

(51) Int. Cl.

| F16F 9/34 | (2006.01) |
|---|---|
| F16F 9/22 | (2006.01) |
| F16F 9/46 | (2006.01) |
| F16F 9/36 | (2006.01) |

(52) U.S. Cl.
CPC .............. *F16F 9/22* (2013.01); *F16F 9/3415* (2013.01); *F16F 9/369* (2013.01); *F16F 9/464* (2013.01)

(58) Field of Classification Search
CPC .. F16F 9/22; F16F 9/3415; F16F 9/369; F16F 9/464; F16F 9/3488; F16F 9/3405
USPC ......... 188/282.2, 282.4, 317, 322.15, 322.18
See application file for complete search history.

(56) References Cited

U.S. PATENT DOCUMENTS

| 4,723,640 A * | 2/1988 | Beck ................. | B60G 17/08 137/614.2 |
|---|---|---|---|
| 5,035,306 A * | 7/1991 | Ashiba ............... | F16F 9/46 188/282.3 |
| 5,078,239 A * | 1/1992 | Kobayashi ........... | F16F 9/466 188/266.7 |
| 5,168,965 A * | 12/1992 | Huang ................ | F16F 9/46 188/282.2 |
| 5,392,883 A * | 2/1995 | Huang ................ | F16F 9/465 188/282.3 |
| 6,182,805 B1 | 2/2001 | Kashiwagi et al. | |

(Continued)

FOREIGN PATENT DOCUMENTS

KR    10-2018-0106284    10/2018

*Primary Examiner* — Thomas W Irvin
(74) *Attorney, Agent, or Firm* — Ladas & Parry, LLP (57) ABSTRACT

Disclosed is a variable damping force shock absorber including a tube cylinder having an inner tube filled with a fluid and an outer tube, a valve housing coupled to a piston rod in the inner tube and having a connection flow path formed therein, a first piston valve coupled to the outside of the valve housing to partition the inner tube into a compression chamber and a rebound chamber, and a second piston valve provided inside the valve housing, wherein the valve housing includes a magnet provided at an upper portion thereof and connected to the piston rod, and a plunger disposed between the magnet and the second piston valve at a lower portion thereof to selectively open and close the connection flow path by a magnetic field of the magnet, and wherein the fluid passes only through the first piston valve when the plunger closes the connection flow path, and the fluid passes through the first piston valve and the second piston valve when the plunger opens the connection flow path.

18 Claims, 10 Drawing Sheets

(56) References Cited

U.S. PATENT DOCUMENTS

| | | | |
|---|---|---|---|
| 6,702,075 B2* | 3/2004 | Hartel | F16F 9/464 188/282.1 |
| 6,981,577 B2* | 1/2006 | Katayama | F16F 9/465 188/267.1 |
| 8,997,952 B2* | 4/2015 | Goetz | F16F 9/464 188/282.4 |
| 10,415,663 B2* | 9/2019 | Luedecke | F16F 9/3405 |
| 10,760,637 B2* | 9/2020 | Manger | F16F 9/46 |
| 10,876,590 B2* | 12/2020 | Miwa | F16F 9/464 |

* cited by examiner

VARIABLE DAMPING FORCE SHOCK ABSORBER

CROSS-REFERENCE TO RELATED APPLICATION(S)

This application is based on and claims priority under 35 U.S.C. § 119 to Korean Patent Application No. 10-2019-0034526, filed on Mar. 26, 2019, in the Korean Intellectual Property Office, the present disclosure of which is incorporated by reference herein in its entirety.

BACKGROUND

1. Field

The present disclosure relates to a variable damping force shock absorber provided in a vehicle to cushion a shock transmitted from the ground.

2. Description of Related Art

In general, a shock absorber is installed in a transportation means such as a vehicle to absorb and relieve vibrations or shocks applied from a road surface during driving to improve ride comfort. The shock absorber typically includes a cylinder and a piston rod installed to perform compression and rebound strokes in the cylinder. The cylinder and the piston rod are each coupled to a vehicle body, wheels, or vehicle axles.

The shock absorber may improve ride comfort by absorbing the vibration caused by an unevenness of a road surface during driving when a damping force is set to a low level and may improve steering stability by suppressing the change of attitude of a vehicle body when the damping force is set to a high level.

Therefore, variable damping force shock absorbers have been developed that may adjust a damping force appropriately to improve ride comfort or steering stability according to road surfaces and driving conditions by mounting a damping force variable valve capable of adjusting the damping force appropriately on one side of the shock absorber.

Most of conventional variable damping force shock absorbers have a structure in which a hard flow path and a soft flow path are selected by selectively opening and closing a plurality of flow paths formed in a spool guide through a change in the position of a spool. That is, by selectively adjusting the opening and closing states of the hard flow path and the soft flow path formed in the spool guide, a hard damping force and a soft damping force may be selectively generated.

To this end, in conventional variable damping force shock absorbers, a back pressure flow path for forming a hard damping force and a soft flow path for forming a soft damping force are separately formed.

Such conventional variable damping force shock absorbers include a piston for partitioning a cylinder into a compression chamber and a rebound chamber, a back pressure chamber for forming a back pressure during the compression and rebound strokes, a main retainer installed between the piston and the back pressure chamber and having a connection flow path formed therein, a disk for generating a damping force between the back pressure chamber and the main retainer, a sub retainer for adjusting a flow path connected to the back pressure chamber, and the like.

The conventional variable damping force shock absorbers may control the damping force in real time by implementing various damping force performance curves as the spool moves according to the current input to a solenoid valve and the flow paths are changed. However, the conventional variable damping force shock absorbers require various sensors (a wheel G-sensor and a body G-sensor) for vehicle behavior recognition, have complicated valve flow paths, and systems thereof are expensive.

Korean Unexamined Patent Publication No. 10-2009-0003019 has been disclosed as an example of a conventional variable damping force shock absorber.

SUMMARY

It is an aspect of the present disclosure to provide a variable damping force shock absorber in which soft or hard damping forces may selectively be used as needed.

Additional aspects of the present disclosure will be set forth in part in the description which follows and, in part, will be obvious from the description, or may be learned by practice of the present disclosure.

In accordance with an aspect of the present disclosure, a variable damping force shock absorber includes a tube cylinder having an inner tube filled with a fluid and an outer tube, a valve housing coupled to a piston rod in the inner tube and having a connection flow path formed therein, a first piston valve coupled to the outside of the valve housing to partition the inner tube into a compression chamber and a rebound chamber, and a second piston valve provided inside the valve housing, wherein the valve housing includes a magnet provided at an upper portion thereof and connected to the piston rod, and a plunger disposed between the magnet and the second piston valve at a lower portion thereof to selectively open and close the connection flow path by a magnetic field of the magnet, and wherein the fluid passes only through the first piston valve when the plunger closes the connection flow path, and the fluid passes through the first piston valve and the second piston valve when the plunger opens the connection flow path.

The plunger may operate in a hard mode in which the connection flow path is closed and in a soft mode in which the connection flow path is opened, and in the soft mode, the fluid passed through the connection flow path may pass through a housing hole connecting the inside and the outside of the valve housing.

The valve housing may include an upper valve housing coupled to the piston rod, and a lower valve housing coupled to a lower portion of the upper valve housing with an interposition of the second piston valve and having the first piston valve disposed outside thereof.

The valve housing may be provided with a housing hole connecting the inside and the outside thereof, and the connection flow path may include the housing hole.

The variable damping force shock absorber may further include a guide seal having one side supported on an inner protrusion adjacent to the housing hole of the valve housing and the other side supported on the second piston valve, wherein the plunger may be in close contact with the guide seal when the housing hole is closed.

The guide seal may include a seal base supported on the inner protrusion of the valve housing and a seal body extending upwardly of the seal base, and the plunger may be in close contact with the seal body when the housing hole is closed.

The variable damping force shock absorber may further include an elastic member disposed between the plunger and the second piston valve to press the plunger toward the magnet side.

The elastic member may have a rebound force for urging the plunger from the second piston valve toward the magnet.

When the magnetic field is applied to the magnet, the plunger may descend while pressing the elastic member to block the flow of fluid directing to the second piston valve.

A non-magnetic plunger guide having a ring shape may be disposed between the valve housing and the plunger.

An elastic member for pressing the plunger to the second piston valve side may be disposed between the magnet and the plunger.

When the magnetic field is applied to the magnet, the plunger may ascend while pressing the elastic member to open the flow of fluid directing to the second piston valve.

The first piston valve may include a first valve flow path, and when the connection flow path is closed, the fluid in the compression chamber may be moved to the rebound chamber through the first valve flow path in a compression stroke of the piston rod, and the fluid in the rebound chamber may be moved to the compression chamber through the first valve flow path in a rebound stroke of the piston rod.

The second piston valve may include a second valve flow path, and when the connection flow path is opened, the fluid in the compression chamber may be moved to the rebound chamber through the second valve flow path in a compression stroke of the piston rod, and the fluid in the rebound chamber may be moved to the compression chamber through the second valve flow path in a rebound stroke of the piston rod.

BRIEF DESCRIPTION OF THE DRAWINGS

These and/or other aspects of the present disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. The drawings are not intended to limit the scope of the present disclosure in any way, and the size of components may be exaggerated for clarity of illustration. Like reference numerals designate like elements throughout the specification.

Figure 1:
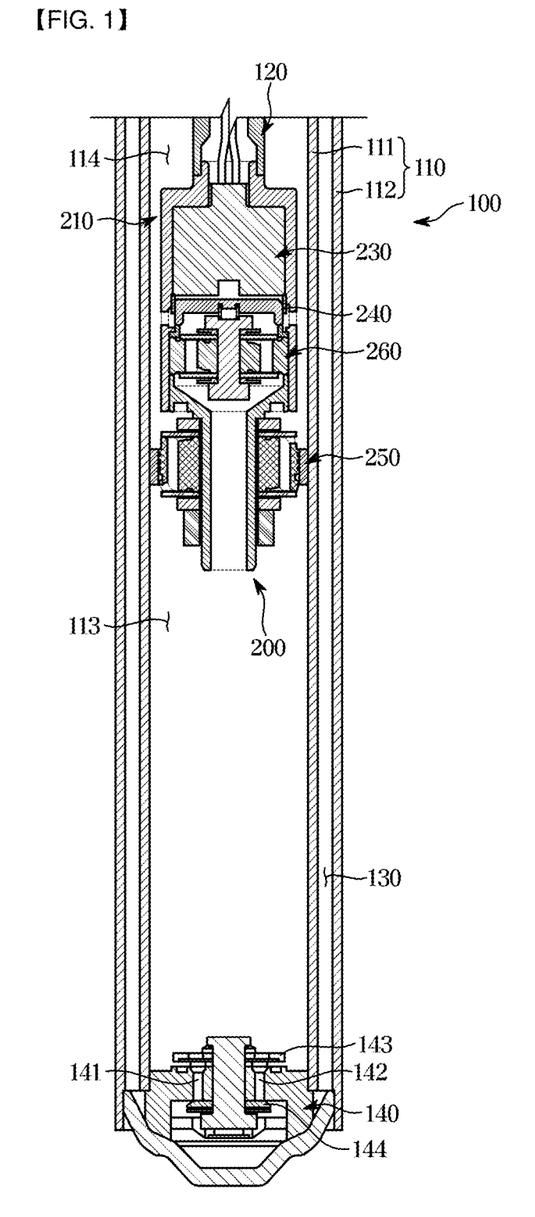
FIG. 1 is a partial cross-sectional view of a variable damping force shock absorber according to a first embodiment of the present disclosure.

FIG. 1 is a partial cross-sectional view of a variable damping force shock absorber according to a first embodiment of the present disclosure.

Referring to FIG. 1, a variable damping force shock absorber according to the first embodiment includes a cylindrical tube unit 100 filled with a fluid, and a valve unit 200 provided inside the tube unit 100 to be selectively opened and closed to perform the compression and rebound strokes of the fluid.

The tube unit 100 may include a tube cylinder 110 including an inner tube 111 and an outer tube 112 which are filled with a fluid, a piston rod 120 disposed inside the inner tube 111 in parallel with the tubes, a fluid storage chamber 130 provided in a space between the inner tube 111 and the outer tube 112, and a body valve 140 positioned at lower ends of the inner tube 111 and the outer tube 112.

The tube cylinder 110 includes the inner tube 111 forming a space therein and the outer tube 112 provided outside the inner tube 111.

The inner tube 111 may have a cylindrical shape in which an inner space thereof is provided long, and a fluid (oil, etc.) is filled in the inner tube 111. The outer tube 112 has a larger outer diameter than the inner tube 111 to surround the inner tube 111, and likewise, is filled with a fluid and may have a shape corresponding to the inner tube 111. The inner tube 111 may be divided into a compression chamber 113 and a rebound chamber 114 by a first piston valve 250 of the valve unit 200, which will be described later.

One ends of the outer tube 112 and the piston rod 120 which are not shown in FIG. 1 are connected to a vehicle body side of a vehicle, and the other ends of the outer tube 112 and the piston rod 120 at which the body valve 140 is disposed are respectively connected to a wheel side, so that the compression and rebound strokes of the fluid for shock absorption may be performed. In addition, each coupling of the vehicle body side and the wheel side may be connected in the opposite direction, and separate coupling portions (not shown) for connecting to the vehicle body side or the wheel side may be provided at opposite ends, respectively.

A valve housing 210 of the valve unit 200 is provided at one end of the piston rod 120 as shown in the FIG. 1, and the other end of the piston rod 120, which is not shown, may extend to the outside of the outer tube 112 to be connected to the vehicle body side or the wheel side of the vehicle.

The fluid storage chamber 130 is provided in a predetermined space between the inner tube 111 and the outer tube 112 and is separated from the compression chamber 113 of the inner tube 111 by the body valve 140. For example, the fluid in the compression chamber 113 may move to the fluid storage chamber 130 through one side flow path 141 of the body valve 140 during the compression stroke of the piston rod 120, and on the contrary, the fluid in the fluid storage chamber 130 may move to the compression chamber 113 through the other flow path 142 of the body valve 140 during the rebound stroke of the piston rod 120.

The body valve 140 is installed at the lower end of the compression chamber 113 to separate the compression chamber 113 and the fluid storage chamber 130. A resistance force is generated in the process of moving the fluid in the rebound and compression stroke directions through the narrow flow paths 141 and 142 of the body valve 140, and a damping force of the shock absorber is generated by the resistance force.

Disks 143 and 144 for opening and closing the flow paths 141 and 142 in a selected direction are provided at upper and lower portions of the body valve 140. For example, the disks 143 and 144 open to allow the fluid to move to the fluid storage chamber 130 through the flow paths of the body valve 140 when the piston rod 120 and the first piston valve 250 perform the compression stroke (downward direction in the drawing), and on the contrary, the disks 143 and 144 open to allow the fluid to move in the opposite direction to the above operation when the piston rod 120 and the first piston valve 250 perform the rebound stroke (upward direction in the drawing).

Figure 2:
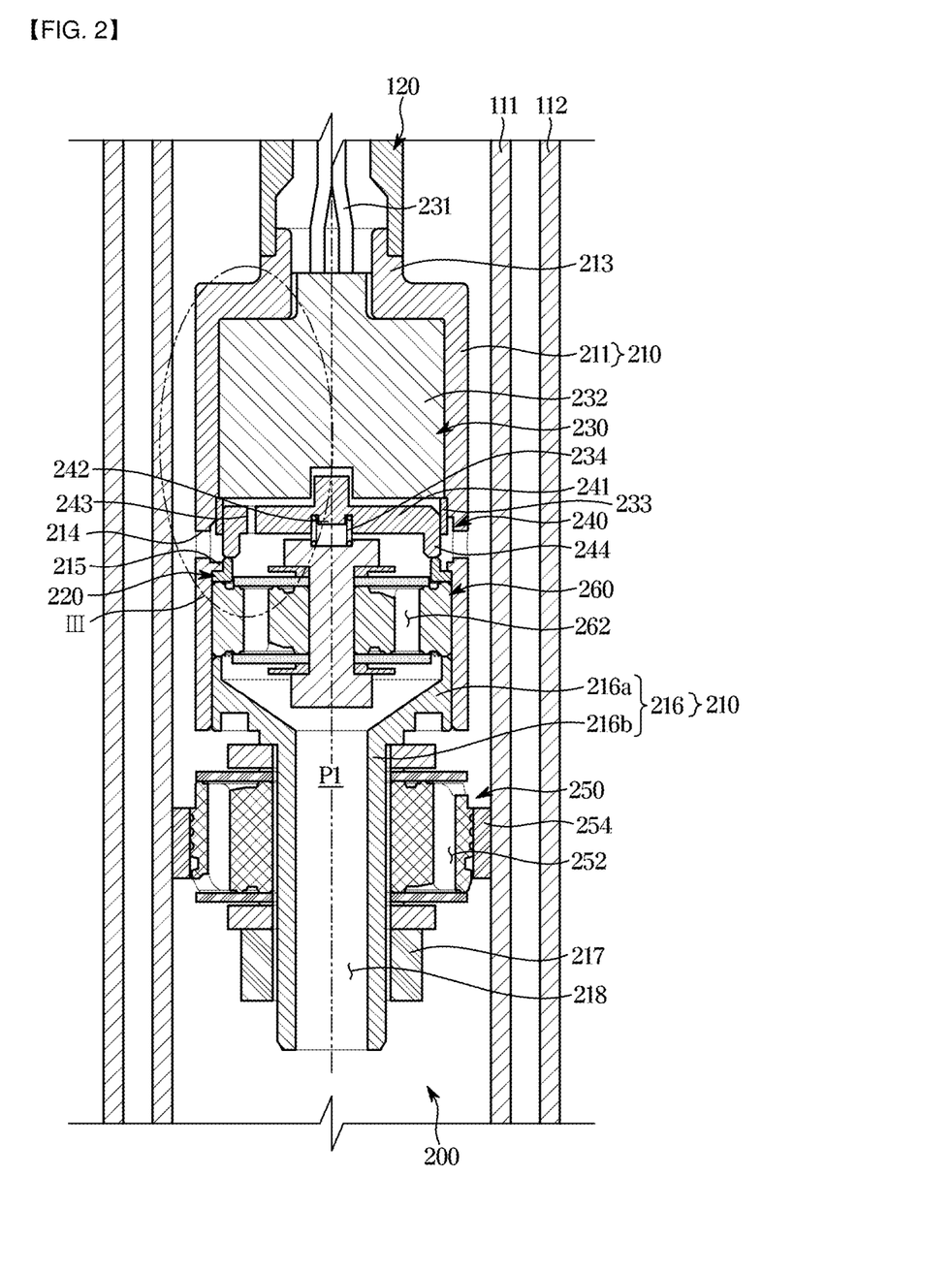
FIG. 2 is an enlarged view of a solenoid valve and a piston valve of the variable damping force shock absorber according to the first embodiment of the present disclosure.

FIG. 2 is an enlarged view of the valve unit of the variable damping force shock absorber according to the first embodiment of the present disclosure.

Referring to FIG. 2, the valve unit 200 of the variable damping force shock absorber according to the present may include a valve housing 210 connected to the piston rod 120, a solenoid valve 230 including a plunger 240 configured to be movable up and down inside the valve housing 210, the first piston valve 250, and a second piston valve 260.

The valve housing 210 is made of a metal material and may include an upper valve housing 211 coupled to the piston rod 120, and a lower valve housing 216 coupled to the upper valve housing 211 and provided with the first piston valve 250 therein.

The upper valve housing 211 is connected to the piston rod 120 by using a rod fastening protrusion 213 provided at an upper portion thereof. The upper valve housing 211 has a 'U' cup shape open downwards, and an inner space of the upper valve housing 211 may be in communication with the outside through a housing hole 214 formed at one side thereof. That is, the rebound chamber 114 of the inner tube 111 and the inside of the valve housing 210 are in communication with each other in the horizontal direction through the housing hole 214, and the fluid passed through the housing hole 214 passes through the opened plunger 240 and then moves in the vertical direction toward the lower valve housing 216.

An inner protrusion 215 is provided on an inner side surface of the upper valve housing 211 adjacent to the housing hole 214, and the inner protrusion 215 is provided with a guide seal 220. The guide seal 220, which will be described in detail later, selectively opens or closes the housing hole 214 by being in close contact with the plunger 240.

The lower valve housing 216 press-fitted from a lower side of the upper valve housing 211 may include a large diameter valve seat 216a, and a small diameter valve guide 216b provided integrally with a lower end of the valve seat 216a and having the first piston valve 250 coupled to an outer surface thereof. The first piston valve 250 may be coupled to the valve guide 216b and then fastened to and restrained by a nut 217 coupled to a lower side of the first piston valve 250.

A guide hole 218 is formed in the vertical direction inside the lower valve housing 216 to connect the compression chamber 113 and a flow path.

The guide hole 218 may extend in the longitudinal direction inside the valve guide 216b to be perpendicular to the housing hole 214. The guide hole 218 may have a larger cross-sectional area than a first valve flow path 252 of the first piston valve 250. In order to move the fluid in the rebound chamber 114 to the compression chamber 113, a second valve flow path 262 may be formed in the second piston valve 260 to penetrate vertically between the housing hole 214 and the guide hole 218.

Figure 3:
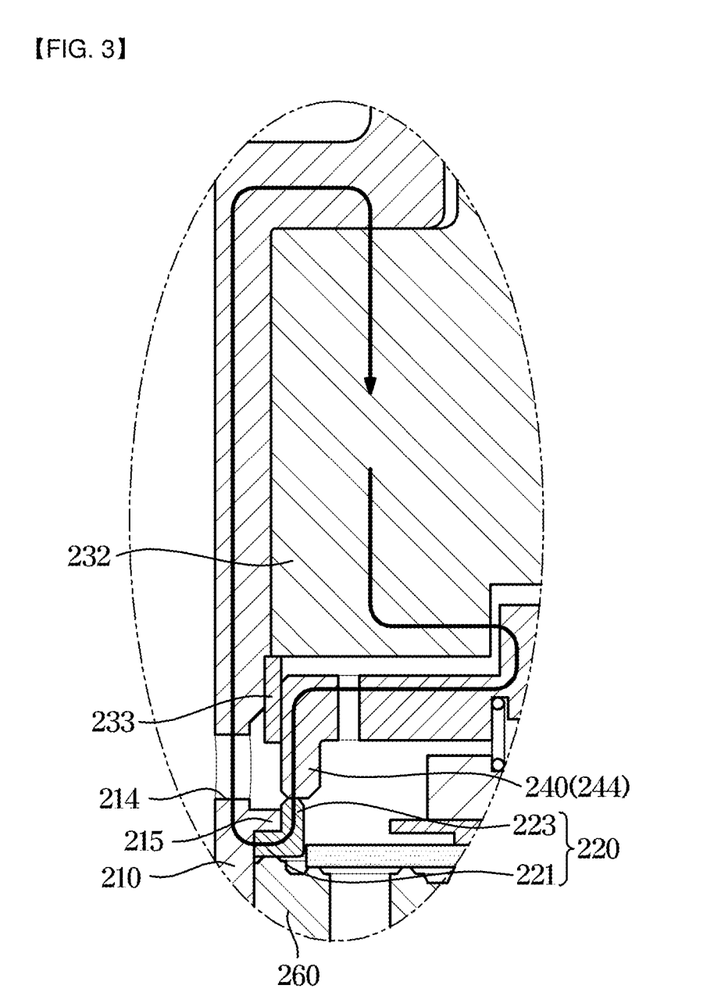
FIG. 3 is an enlarged view of a portion of FIG. 2.

The guide seal 220 is formed in a ring shape as a whole, and has a hat shape in cross section as shown in FIG. 3. The guide seal 220 includes a lower seal base 221 and a seal body 223 extending from an upper portion of the seal base 221.

An upper surface of the seal base 221 is supported by the inner protrusion 215 of the upper valve housing 211 and a lower surface of the seal base 221 is supported by the second piston valve 260. Thus, the guide seal 220 may be firmly fixed by the upper and lower portions thereof being restrained by the valve housing 210 and the second piston valve 260.

Because an upper end of the seal body 223 is in close contact with a lower end of the plunger 240, which ascends and descends, to open and close the housing hole 214, with simple structure and size changes, a flow path area affecting the damping force may be effectively adjusted.

The seal body 223 serves as a stopper by coming in contact with the plunger 240 when the plunger 240, which ascends and descends in the valve housing 210, moves downward, so that a movable range of the plunger 240 may be limited, and further, component interference that may occur during assembly of the plunger 240 and the second piston valve 260 may be effectively prevented.

As such, the guide seal 220 may restrain the second piston valve 260 up and down together with the lower valve housing 216. The second piston valve 260 will be described later.

As described above, when the plunger 240 is opened, the fluid sequentially passes through the housing hole 214 provided in the upper valve housing 211, the second valve flow path 262 provided in the second piston valve 260, and the guide hole 218 provided in the lower valve housing 216. Hereinafter, the passages 214, 262, and 218 in communication with them will be referred to as a connection flow path P1. That is, the connection flow path (refer to P1 in FIG. 2) may be formed in the valve housing 210 to communicate the compression chamber 113 and the rebound chamber 114 through the second piston valve 260 during the opening operation of the plunger 240.

As illustrated in FIG. 2, the solenoid valve 230 is coupled to the piston rod 120 located inside the inner tube 111 to raise and lower the plunger 240 while electrically operating to selectively open or close the housing hole 214 of the connection flow path P1.

To this end, the solenoid valve 230 may include a magnet 232 forming a magnetic field with electricity transmitted from a wire 231 which is a power supply means, a plunger 240 raised and lowered by the magnet 232, and an elastic member 234 disposed between the magnet 232 and the plunger 240 to provide an elastic force.

The magnet 232 converts the variable shock absorber into a soft mode or a hard mode through magnetic coupling (magnetic force) with the plunger 240 which is a magnetic body by a power supplied from an external source. That is, the solenoid valve 230 causes the plunger 240 to ascend or descend according to a direction in which the magnetic field is formed, so that the fluid may pass through either the first piston valve 250 or the second piston valve 260 to vary a damping force.

A plunger guide 233 of a ring form may be provided between the magnet 232 and the plunger 240. The non-magnetic plunger guide 233 prevents the magnetic field of the magnet 232 from being directly magnetically connected to the valve housing 210 from the plunger 240.

That is, as shown in FIG. 3, as the magnetic field generated by the magnet 232 is interrupted by the non-magnetic plunger guide 233, a flow of magnetic flux passing through the plunger 240 and the guide seal 220, which are made of a metal material, and moving to the valve housing 210 is formed, as indicated by a clockwise arrow.

The elastic member 234 is interposed between the plunger 240 and the second piston valve 260. Therefore, when current is applied to the solenoid valve 230, the plunger 240 moves up and down while resisting an elastic restoring force (rebound force) of the elastic member 234.

The plunger 240 closes the connection flow path P1 when operating in the hard mode to allow the fluid to pass through only the first piston valve 250, and opens the connection flow path P1 when operating in the soft mode to allow the fluid to pass through the second piston valve 260.

The plunger 240 may include a disc-shaped plunger body 241 made of a metal material, a plunger protrusion 242 formed at an upper portion of the plunger body 241 to restrain the elastic member 234, and a plunger well 244 protruding downward from an edge of the plunger body 241 to open or close the housing hole 214 of the valve housing 210 by ascending or descending of the plunger body 241.

The plunger body 241 may include at least one drain hole 243 in a thickness direction. The plunger well 244 opens the housing hole 214 when the plunger 240 is raised and closes the housing hole 214 when the plunger 240 is lowered. On the contrary, unlike shown, the plunger well 244 may be configured to close the housing hole 214 when the plunger 240 is raised and open the housing hole 214 when the plunger 240 is lowered. When closing the housing hole 214, a bottom surface of the plunger well 244 is in close contact with a top surface of the guide seal 220.

In the present embodiment, the plunger 240 keeps the housing hole 214 in an opened state while ascending by the elastic restoring force of the elastic member 234 when the solenoid valve 230 does not operate, and closes the housing hole 214 by descending while resisting the elastic restoring force of the elastic member 234 when the solenoid valve 230 operates.

As described above, the first piston valve 250 divides the inside of the inner tube 111 into the compression chamber 113 and the rebound chamber 114 and generates a damping force by using a resistance force of the fluid generated while reciprocating the inner tube 111. For example, because a pressure of the lower compression chamber 113 increases compared to the upper rebound chamber 114 when the first piston valve 250 performs the compression stroke, the fluid filled in the compression chamber 113 moves to the rebound chamber 114 by pushing and opening a valve means (not shown) such as a disk through the first valve flow path 252, and in this process, a damping force is generated by the resistance force of the fluid. On the contrary, when the first piston valve 250 performs the rebound stroke, the fluid moves in a direction opposite to that in the compression stroke process described above.

A gap ring 254 may be interposed between the first piston valve 250 and the inner tube 111. The gap ring 254 is made of a plastic material to prevent damage or deformation caused by direct contact between the inner tube 111 and the first piston valve 250 which are made of a metal material.

The second piston valve 260 allows the compression chamber 113 and the rebound chamber 114 to be in communication with each other through the second valve flow path 262. The second piston valve 260 may generate relatively less flow resistance than the first piston valve 250 in the fluid movement between the compression chamber 113 and the rebound chamber 114. The second piston valve 260 may be firmly positioned by being fitted between the guide seal 220 provided in the upper valve housing 211 and the valve seat 216a of the lower valve housing 216.

In a state in which the connection flow path P1 is opened, the second piston valve 260 may move the fluid in the compression chamber 113 to the rebound chamber 114 through the second valve flow path 262 during the compression stroke of the piston rod 120 and may move the fluid in the rebound chamber 114 to the compression chamber 113 through the second valve flow path 262 during the rebound stroke of the piston rod 120.

Figure 4:
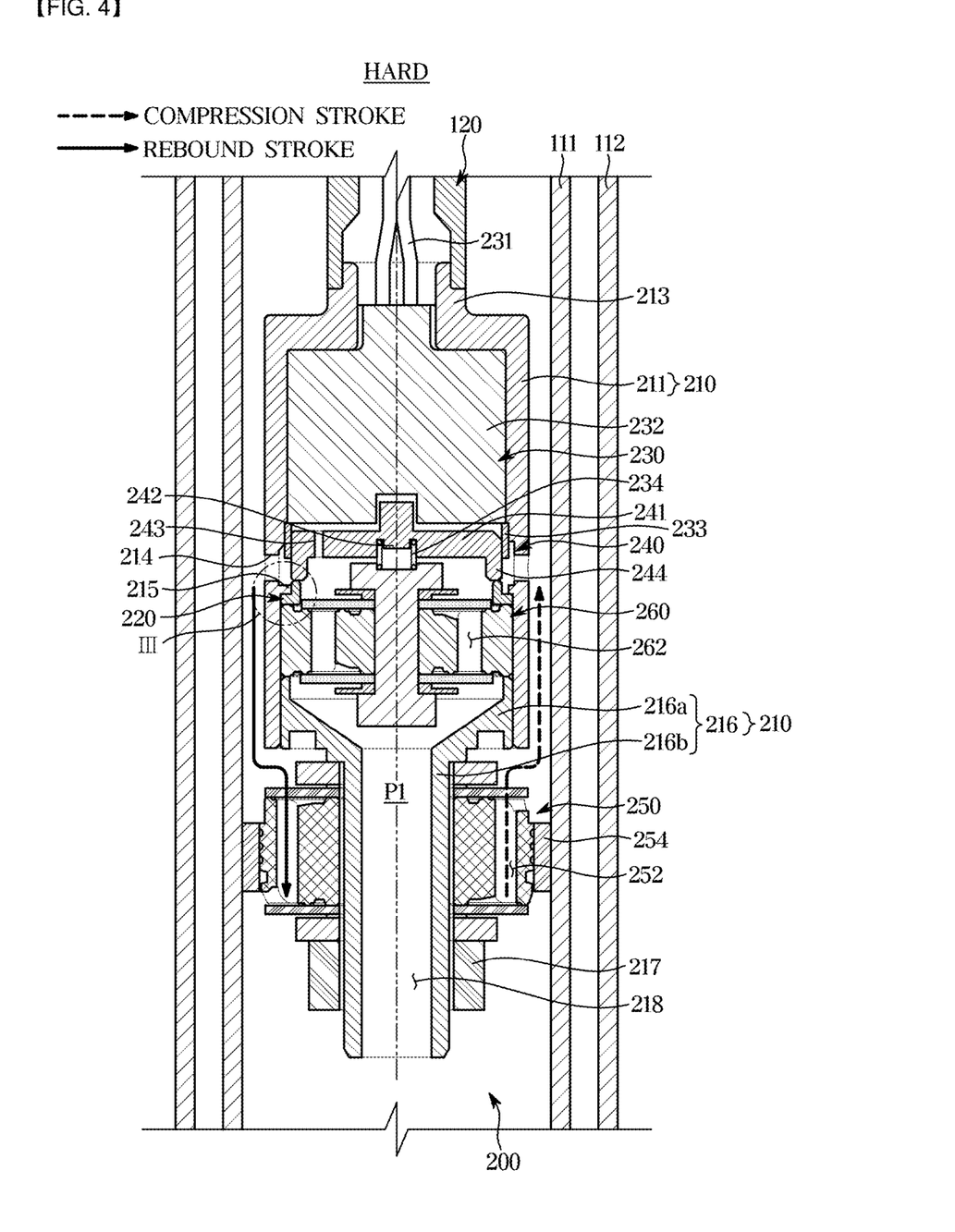
FIG. 4 is a cross-sectional view illustrating a state in which a plunger is moved to a hard mode in the variable damping force shock absorber according to the first embodiment of the present disclosure.
Figure 5:
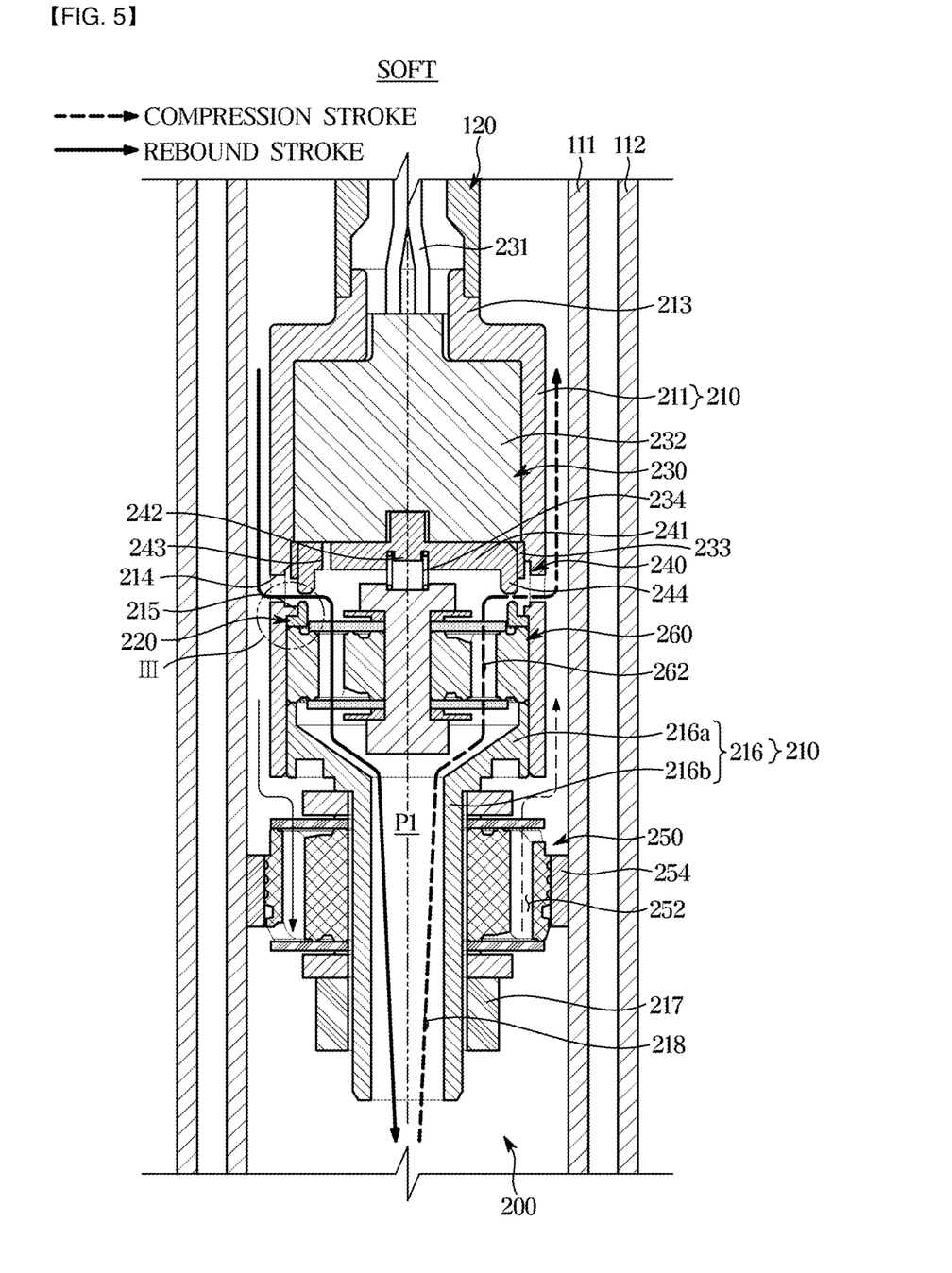
FIG. 5 is a cross-sectional view illustrating a state in which the plunger is moved to a soft mode in the variable damping force shock absorber according to the first embodiment of the present disclosure.

FIG. 4 is a cross-sectional view illustrating a state in which a plunger is moved to a hard mode in the variable damping force shock absorber according to the first embodiment of the present disclosure, and FIG. 5 is a cross-sectional view illustrating a state in which the plunger is moved to a soft mode in the variable damping force shock absorber according to the first embodiment of the present disclosure. Hereinafter, the operation of the variable damping force shock absorber will be described with reference to FIGS. 4 and 5.

In the compression stroke of the piston rod 120 in a state where the plunger 240 is lowered by the solenoid valve 230 (hard mode), as indicated by a dotted line in FIG. 4, the fluid in the compression chamber 113 moves to the rebound chamber 114 through the first valve flow path 252, for example, a main flow path, of the first piston valve 250. The fluid moving to the rebound chamber 114 through the first piston valve 250 generates a hard damping force.

On the contrary, in the rebound stroke of the piston rod 120 in the state where the plunger 240 is lowered by the solenoid valve 230 (hard mode), as indicated by a solid line in FIG. 4, the fluid in the rebound chamber 114 generates the hard damping force while moving to the compression chamber 113 through the main flow path of the first piston valve 250.

On the other hand, in the compression stroke of the piston rod 120 in a state in which the plunger 240 is raised by the elastic member 234 (soft mode), as indicated by a dotted line in FIG. 5, the fluid in the compression chamber 113 is introduced into the guide hole 218, and the fluid passed through the connection flow path P1 through the guide hole 218 generates the soft damping force while moving to the rebound chamber 114 through the second valve flow path 262 of the second piston valve 260, for example, an auxiliary flow path and the housing hole 214.

On the contrary, in the rebound stroke of the piston rod 120 in the state in which the plunger 240 is raised by the elastic member 234 (soft mode), as indicated by a solid line in FIG. 5, the fluid in the rebound chamber 114 generates the soft damping force while moving to the compression chamber 113 through the housing hole 214, the second valve flow path 262 of the second piston valve 260 and the guide hole 218.

As described above, in the variable damping force shock absorber according to an embodiment of the present disclosure, the second piston valve 260 (soft valve) is positioned in the valve housing 210, and the first piston valve 250 (hard valve) is positioned outside the valve housing 210. In addition, the plunger 240 positioned in the valve housing 210 selectively opens and closes the housing hole 214 while moving up and down according to the current input to the solenoid valve 230.

When the plunger 240 moves downward to block the housing hole 214, as a sub flow path introduced into the connection flow path P1 is blocked, the fluid is introduced into the main flow path on the first piston valve 250 side to cause the hard damping force. On the contrary, when the plunger 240 is moved upward to open the housing hole 214, the fluid is introduced into the connection flow path P1 and then moves through the sub flow path on the second piston valve 260 side to cause the soft damping force.

Therefore, the variable damping force shock absorber according to the present embodiment may form two modes of damping force (soft damping force/hard damping force) to increase ride comfort and adjustment stability compared to the existing shock absorbers and further to have a simple structure. In addition, the first piston valve 250 and the second piston valve 260 may be separately configured to be tuned independently, and the two-way (rebound/compression direction) simultaneous control is also possible, and the tuning freedom is also high.

FIGS. 6 to 10 illustrate a variable damping force shock absorber according to a second embodiment of the present disclosure. The present embodiment will be described based on differences from the first embodiment, and components having the same reference numerals perform the same functions and thus will not be described in detail.

As described above, the variable damping force shock absorber according to the first embodiment is a normal open type in which the connection flow path P1 is maintained in an open state by using the elastic restoring force of the elastic member 234 when the solenoid valve 230 does not operate (no magnetic field is formed) and the connection flow path P1 is closed while resisting the elastic restoring force of the elastic member 234 when the solenoid valve 230 operates (a magnetic field is formed).

On the contrary, the variable damping force shock absorber according to the second embodiment is a normal closed type in which the connection flow path P1 is maintained in a closed state by using the elastic restoring force of the elastic member 234 when the solenoid valve 230 does not operate (no magnetic field is formed) and the connection flow path P1 is opened while resisting the elastic restoring force of the elastic member 234 when the solenoid valve 230 operates (a magnetic field is formed).

Figure 6:
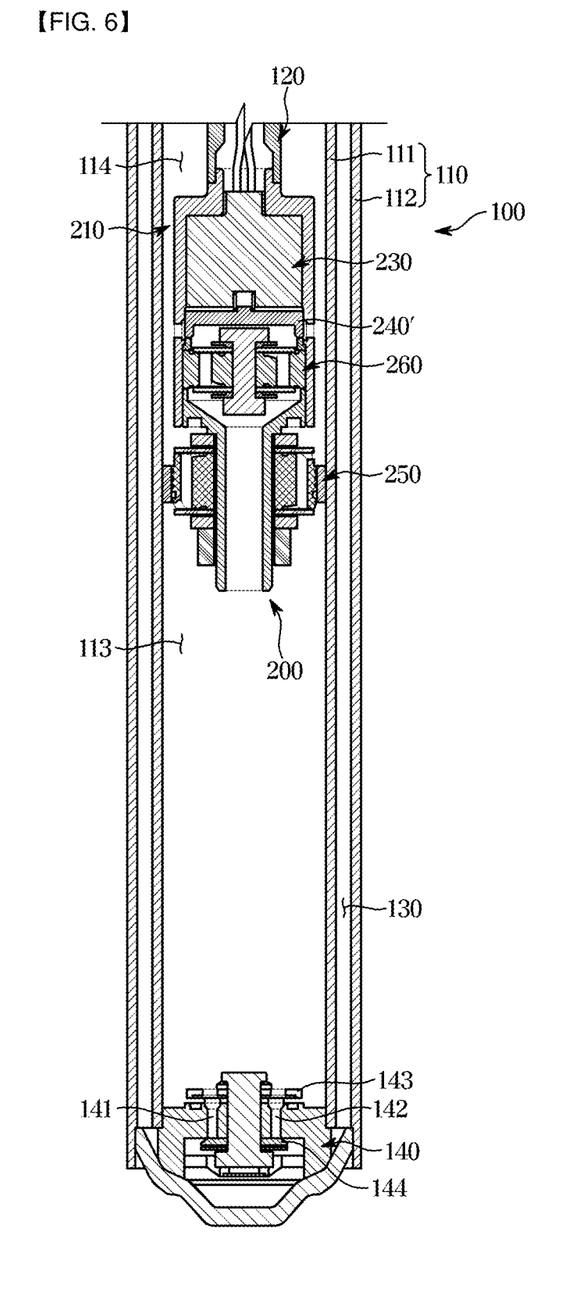
FIG. 6 is a partial cross-sectional view of a variable damping force shock absorber according to a second embodiment of the present disclosure.
Figure 7:
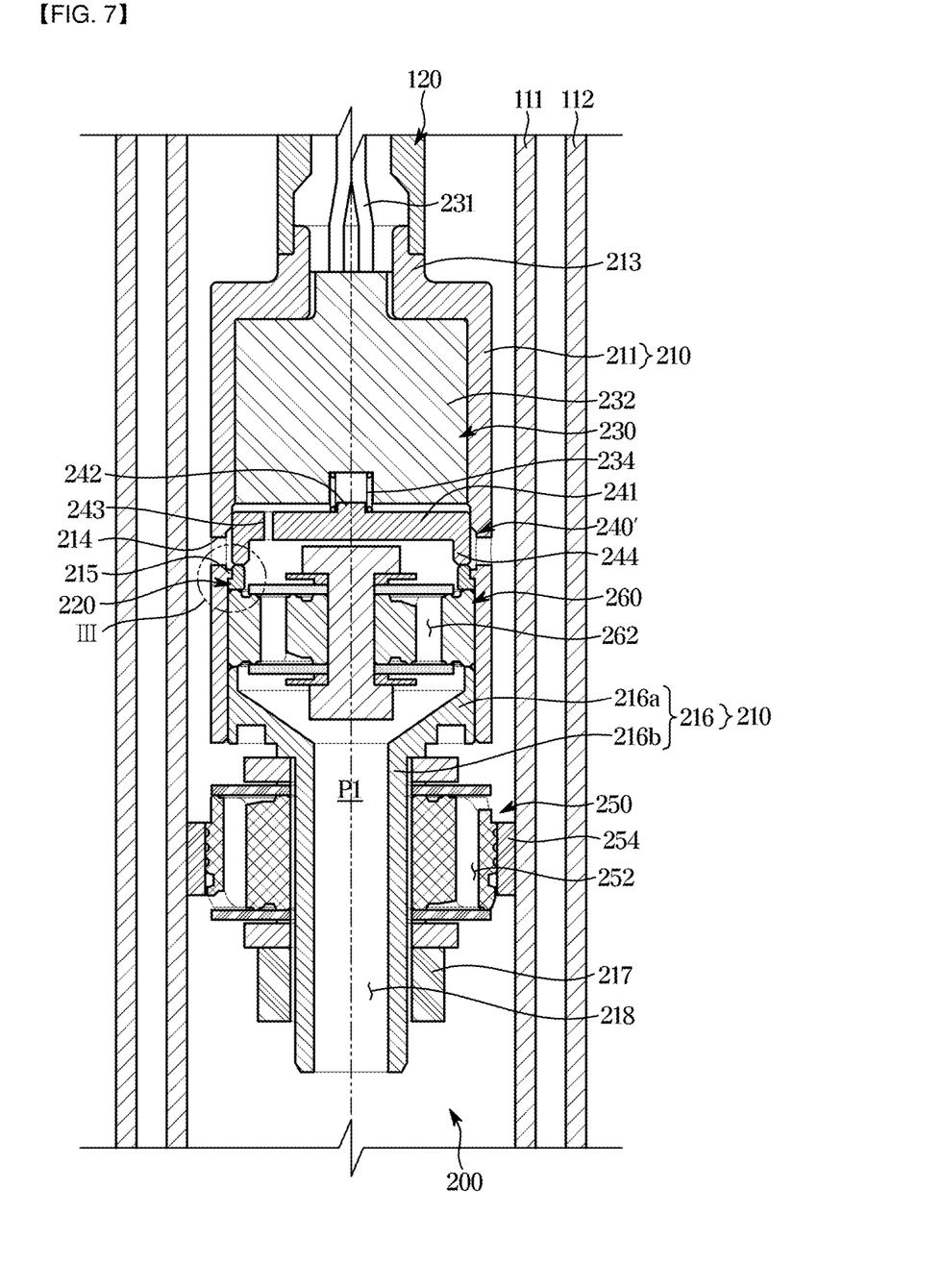
FIG. 7 is an enlarged view of a solenoid valve and a piston valve of the variable damping force shock absorber according to the second embodiment of the present disclosure.

In detail, the variable damping force shock absorber according to the second embodiment includes the tube unit 100, and valve unit 200 provided inside the tube unit 100 to be selectively opened and closed to perform the compression and rebound strokes of the fluid. The valve unit 200 includes the valve housing 210 connected to the piston rod 120, the solenoid valve 230 including a plunger 240' configured to be movable up and down inside the valve housing 210, the first piston valve 250, and the second piston valve 260.

In the variable damping force shock absorber configured as described above, when being raised by the magnetic field formed in the magnet 232, the plunger 240' opens the connection flow path P1 while resisting the elastic restoring force of the elastic member 234, and when the magnetic field is not formed in the magnet 232 and the plunger 240' is lowered by the elastic restoring force of the elastic member 234, the plunger 240' closes the connection flow path P1.

Figure 9:
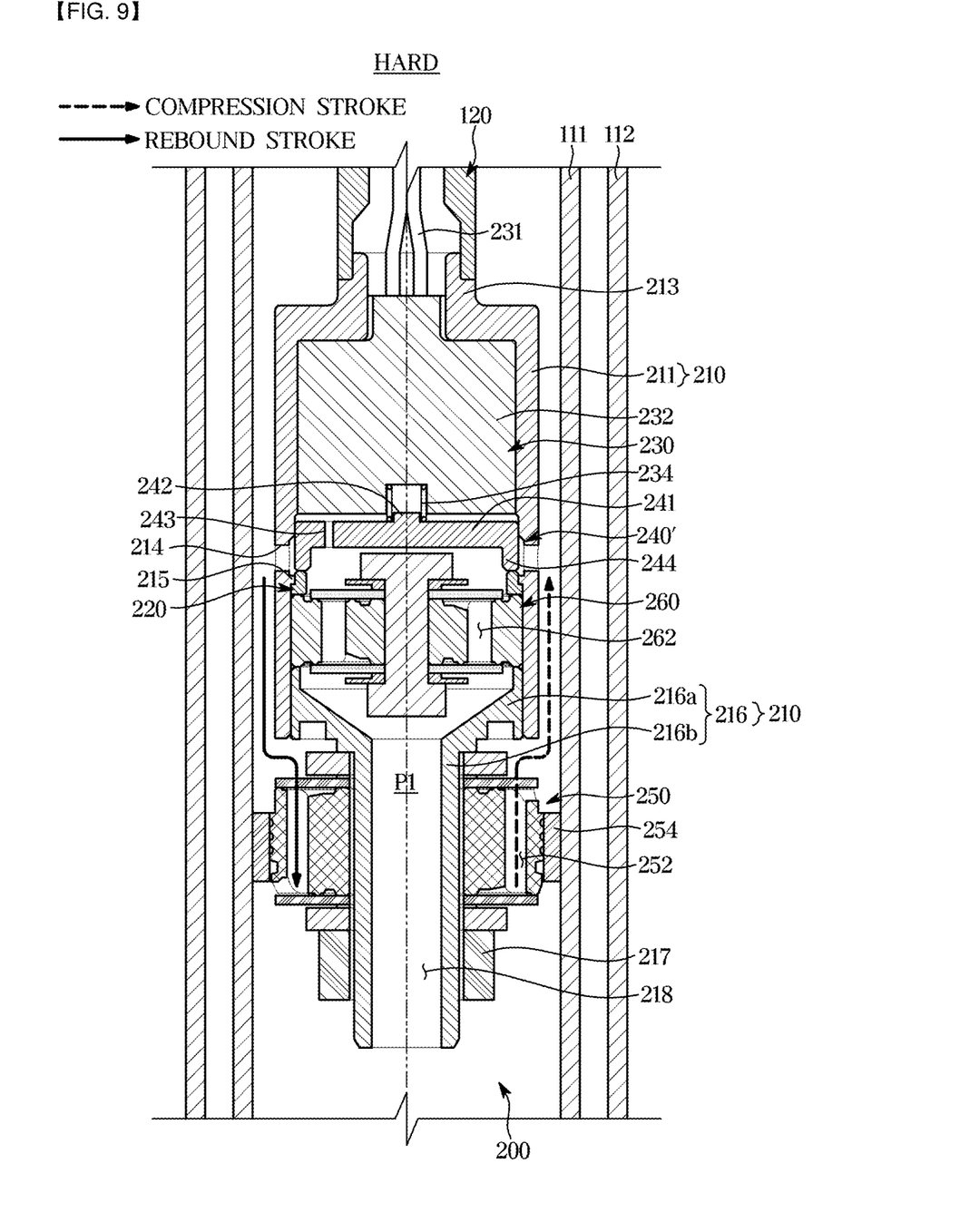
FIG. 9 is a cross-sectional view illustrating a state in which a plunger is moved to a hard mode in the variable damping force shock absorber according to the second embodiment of the present disclosure.
Figure 10:
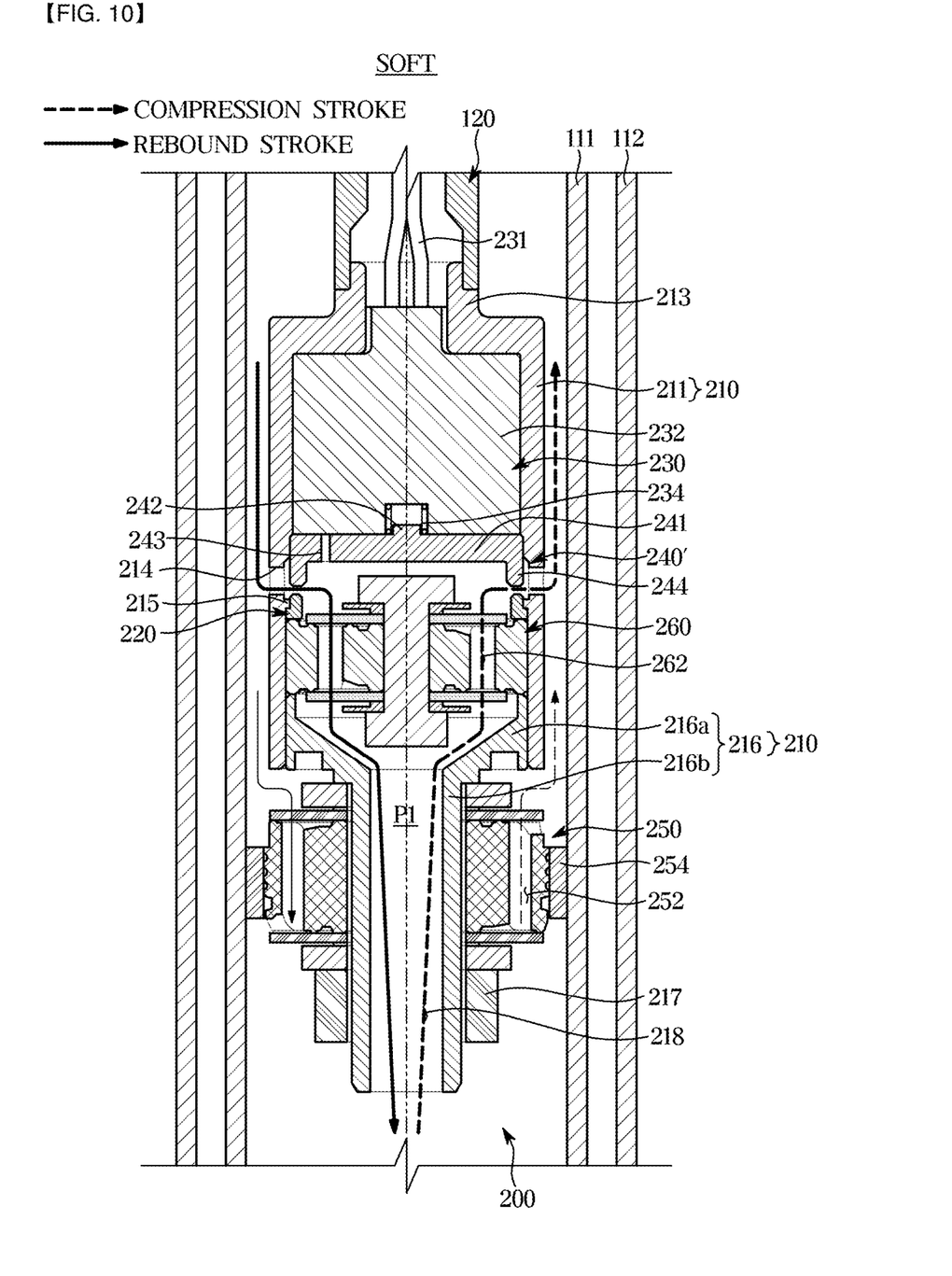
FIG. 10 is a cross-sectional view illustrating a state in which the plunger is moved to a soft mode in the variable damping force shock absorber according to the second embodiment of the present disclosure.

As illustrated in FIGS. 9 and 10, the variable damping force shock absorber configured as described above may operate in both the hard and soft modes.

In the compression stroke of the piston rod 120 in a state where the plunger 240' is lowered by the elastic member 234 (hard mode), as indicated by a dotted line in FIG. 9, the fluid in the compression chamber 113 moves to the rebound chamber 114 through the first valve flow path 252, for example, a main flow path, of the first piston valve 250. The fluid moving to the rebound chamber 114 through the first piston valve 250 generates a hard damping force.

Figure 8:
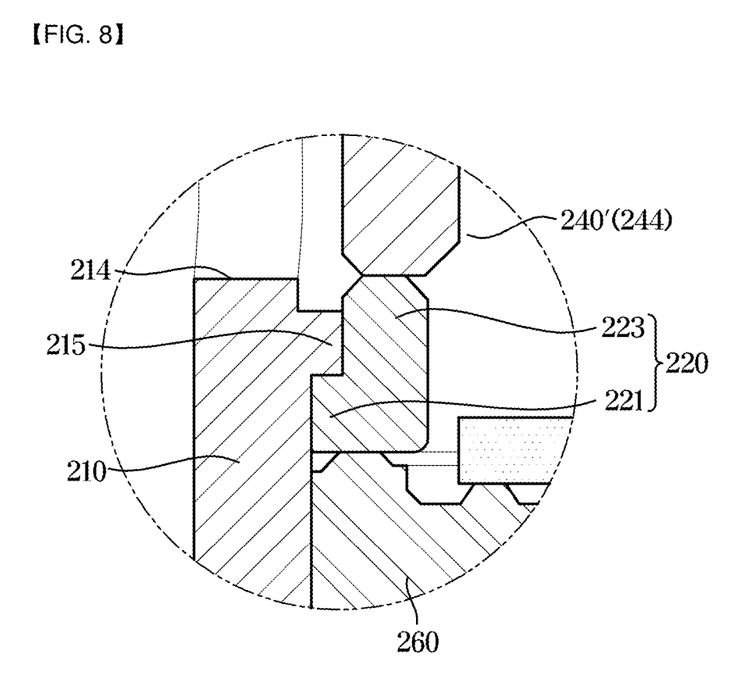
FIG. 8 is an enlarged view of a portion of FIG. 7.

On the contrary, in the rebound stroke of the piston rod 120 in the state where the plunger 240' is lowered by the elastic member 234 (hard mode), as indicated by a solid line in FIG. 8, the fluid in the rebound chamber 114 generates the hard damping force while moving to the compression chamber 113 through the main flow path of the first piston valve 250.

On the other hand, in the compression stroke of the piston rod 120 in a stare in which the plunger 240' is raised by the magnetic field formed by the solenoid valve 230 (soft mode), as indicated by a dotted line in FIG. 10, the fluid in the compression chamber 113 is introduced into the guide hole 218, and the fluid passed through the connection flow path P1 through the guide hole 218 generates the soft damping force while moving to the rebound chamber 114 through the second valve flow path 262 of the second piston valve 260, for example, an auxiliary flow path and the housing hole 214.

On the contrary, in the rebound stroke of the piston rod 120 in the state in which the plunger 240' is raised by the magnetic field formed by the solenoid valve 230 (soft mode), as indicated by a solid line in FIG. 10, the fluid in the rebound chamber 114 generates the soft damping force while moving to the compression chamber 113 through the housing hole 214, the second valve flow path 262 of the second piston valve 260 and the guide hole 218.

The variable damping force shock absorber according to the second embodiment does not include the plunger guide 233 of the first embodiment but may include the same.

As is apparent from the above, in a variable damping force shock absorber according to the present disclosure, a plunger is raised and lowered inside a tube cylinder by a solenoid valve to open and close a flow path through which a fluid passes, so that a soft or hard damping force can be selectively used as needed.

Further, the variable damping force shock absorber according to the present disclosure is not only not bulky but also not complicated by providing a first piston valve outside a valve housing of the tube cylinder and providing a second piston valve inside the valve housing, thereby reducing the manufacturing cost. In addition, the first piston valve and the second piston valve is separately configured to be tuned independently, and the two-way (rebound/compression direction) simultaneous control is also possible, and the tuning freedom is also high.

Further, the variable damping force shock absorber according to the present disclosure forms two modes of damping force (soft damping force/hard damping force) to increase ride comfort and adjustment stability compared to the existing shock absorbers.

While the present disclosure has been particularly described with reference to exemplary embodiments, it should be understood by those of skilled in the art that various changes in form and details may be made without departing from the spirit and scope of the present disclosure.

What is claimed is:
1. A variable damping force shock absorber comprising:
   a tube cylinder having an inner tube filled with a fluid and an outer tube;
   a valve housing coupled to a piston rod in the inner tube and having a connection flow path formed therein;

a first piston valve coupled to the outside of the valve housing to partition the inner tube into a compression chamber and a rebound chamber; and a second piston valve provided inside the valve housing, wherein the valve housing comprises:

a magnet provided at an upper portion of the valve housing and connected to the piston rod;

a plunger disposed between the magnet and the second piston valve at a lower portion of the valve housing to selectively open and close the connection flow path by a magnetic field of the magnet; and a guide seal configured to selectively open and close a housing hole formed at the valve housing in response to movement of the plunger, the guide seal disposed between the plunger and the second piston valve, wherein the fluid passes only through the first piston valve when the plunger closes the connection flow path, and the fluid passes through the first piston valve and the second piston valve when the plunger opens the connection flow path, and wherein the variable damping force shock absorber further comprises an elastic member disposed between the plunger and the second piston valve to press the plunger toward the magnet, wherein one end of the elastic member contacts the plunger and an other end of the elastic member directly contacts the second piston valve.

2. The variable damping force shock absorber according to claim 1, wherein the plunger operates in a hard mode in which the connection flow path is closed and in a soft mode in which the connection flow path is opened, and in the soft mode, the fluid passed through the connection flow path passes through the housing hole connecting the inside and the outside of the valve housing.

3. The variable damping force shock absorber according to claim 1, wherein the valve housing comprises:

an upper valve housing coupled to the piston rod; and a lower valve housing coupled to a lower portion of the upper valve housing with an interposition of the second piston valve and having the first piston valve disposed outside thereof.

4. The variable damping force shock absorber according to claim 3, wherein the valve housing is provided with the housing hole connecting the inside and the outside thereof, and the connection flow path comprises the housing hole.

5. The variable damping force shock absorber according to claim 1, further comprising an elastic member disposed between the plunger and the second piston valve to press the plunger toward the magnet.

6. The variable damping force shock absorber according to claim 5, wherein the elastic member has a rebound force for urging the plunger from the second piston valve toward the magnet.

7. The variable damping force shock absorber according to claim 5, wherein when the magnetic field is applied to the magnet, the plunger descends while pressing the elastic member to block the flow of fluid directing to the second piston valve.

8. The variable damping force shock absorber according to claim 7, wherein a non-magnetic plunger guide having a ring shape is disposed between the valve housing and the plunger.

9. The variable damping force shock absorber according to claim 1, wherein an elastic member for pressing the plunger to the second piston valve side is disposed between the magnet and the plunger.

10. The variable damping force shock absorber according to claim 9, wherein when the magnetic field is applied to the magnet, the plunger ascends while pressing the elastic member to open the flow of fluid directing to the second piston valve.

11. The variable damping force shock absorber according to claim 1, wherein the first piston valve comprises a first valve flow path, and when the connection flow path is closed, the fluid in the compression chamber is moved to the rebound chamber through the first valve flow path in a compression stroke of the piston rod, and the fluid in the rebound chamber is moved to the compression chamber through the first valve flow path in a rebound stroke of the piston rod.

12. The variable damping force shock absorber according to claim 1, wherein the second piston valve comprises a second valve flow path, and when the connection flow path is opened, the fluid in the compression chamber is moved to the rebound chamber through the second valve flow path in a compression stroke of the piston rod, and the fluid in the rebound chamber is moved to the compression chamber through the second valve flow path in a rebound stroke of the piston rod.

13. The variable damping force shock absorber according to claim 1, wherein the plunger has a protrusion part protruding toward the guide seal disposed between the plunger and the second piston valve, the protrusion part of the plunger configured to selectively open and close the housing hole formed at the valve housing in association with the guide seal in response to the movement of the plunger.

14. The variable damping force shock absorber according to claim 1, wherein the plunger comprises a plunger protrusion protruding from a surface of the plunger toward the elastic member to restrain the elastic member.

15. The variable damping force shock absorber according to claim 1, further comprising a non-magnetic plunger guide disposed between the valve housing and the plunger.

16. The variable damping force shock absorber according to claim 15, wherein the non-magnetic plunger guide disposed between the valve housing and the plunger is configured to prevent magnetic field of the magnet from being directly magnetically connected to the valve housing.

17. A variable damping force shock absorber comprising:

a tube cylinder having an inner tube filled with a fluid and an outer tube;

a valve housing coupled to a piston rod in the inner tube and having a connection flow path formed therein;

a first piston valve coupled to the outside of the valve housing to partition the inner tube into a compression chamber and a rebound chamber; and a second piston valve provided inside the valve housing, wherein the valve housing comprises:

a magnet provided at an upper portion of the valve housing and connected to the piston rod;

a plunger disposed between the magnet and the second piston valve at a lower portion of the valve housing to selectively open and close the connection flow path by a magnetic field of the magnet; and a guide seal configured to selectively open and close a housing hole formed at the valve housing in response to movement of the plunger, the guide seal disposed between the plunger and the second piston valve, wherein the fluid passes only through the first piston valve when the plunger closes the connection flow path, and the fluid passes through the first piston valve and the second piston valve when the plunger opens the connection flow path, wherein the guide seal has one side supported on an inner protrusion adjacent to the housing hole of the valve housing and the other side supported on the second piston valve, and wherein the plunger is in close contact with the guide seal when the housing hole is closed.

18. The variable damping force shock absorber according to claim 17, wherein the guide seal comprises a seal base supported on the inner protrusion of the valve housing and a seal body extending upwardly of the seal base, and the plunger is in close contact with the seal body when the housing hole is closed.

* * * * *